(12) United States Patent
Tetard

(10) Patent No.: US 12,631,666 B2
(45) Date of Patent: May 19, 2026

(54) CONTROLLED CREATION OF SUB-50 NM DEFECTS IN 2D MATERIALS AT LOW TEMPERATURE

(71) Applicant: University of Central Florida Research Foundation, Inc., Orlando, FL (US)

(72) Inventor: Laurene Tetard, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 393 days.

(21) Appl. No.: 18/209,843

(22) Filed: Jun. 14, 2023

(65) Prior Publication Data

US 2023/0417795 A1     Dec. 28, 2023

Related U.S. Application Data

(60) Provisional application No. 63/352,901, filed on Jun. 16, 2022.

(51) Int. Cl.
| | |
|---|---|
| *G01Q 80/00* | (2010.01) |
| *G01Q 70/10* | (2010.01) |
| *G01Q 70/14* | (2010.01) |

(52) U.S. Cl.
CPC ............. *G01Q 80/00* (2013.01); *G01Q 70/10* (2013.01); *G01Q 70/14* (2013.01)

(58) Field of Classification Search
CPC ......... G01Q 80/00; G01Q 70/10; G01Q 70/14
See application file for complete search history.

(56) References Cited

U.S. PATENT DOCUMENTS 6,884,999 B1 * 4/2005 Yedur ..................... H01L 22/20
369/126

* cited by examiner

*Primary Examiner* — Nicole M Ippolito
(74) *Attorney, Agent, or Firm* — Troutman Pepper Locke LLP; Gabrielle L. Gelozin

(57) ABSTRACT

This disclosure relates to an method for the nanoscale creation of functional defects in 2D materials with the ability to control their dimensions and compositions.

20 Claims, 8 Drawing Sheets

(a)

(b)

1

CONTROLLED CREATION OF SUB-50 NM DEFECTS IN 2D MATERIALS AT LOW TEMPERATURE

CROSS-REFERENCE TO RELATED APPLICATIONS

This application claims the benefit of priority to U.S. Non Provisional Patent Application No. 63/352,901, filed Jun. 16, 2022, the disclosure of which is incorporated herein by reference in its entirety.

STATEMENT OF FEDERALLY FUNDED RESEARCH

This invention was made with government support under contract no. 1847830 awarded by the national science foundation. Accordingly, the government has certain rights in this invention.

FIELD

This disclosure relates to a method for the nanoscale creation of functional defects in 2D materials with the ability to control their dimensions and compositions.

BACKGROUND

The predicted electronic properties of two-dimensional (2D) graphene and monolayer metal dichalcogenides have bolstered the interest in fundamental and applied research in nanoelectronics. However, challenges associated with the scalability of growth processes, variations in bandgap due to intrinsic and extrinsic defects, and fluctuations in electron mobility in presence of various substrates constitute significant bottlenecks that continue to impede the full exploitation of 2D materials. Meanwhile, the surge in their integration to energy materials for solar cells, supercapacitors and batteries has resulted in enhanced performances, suggesting that they can participate and boost selected chemical reactions. The benefit they bring about for electrochemical reactions, which has been in part attributed to the high surface area of 2D materials, is now well established. However, the role of defects in these reactions is less understood. New functionalities have been conferred to 2D materials using chemical treatments or doping, while maintaining the merits of their conformation, as is the case for graphene hybridization or engineered defects in hexagonal boron nitride (h-BN) As a result, the performance of selected processes could be improved to benefit charge/discharge efficiency, energy density, lifetime and other properties.

Moreover strong connections have been established between electronic and catalytic properties of 2D materials. To date, graphene has shown interesting behavior for electrocatalysis, photocatalysis as well as conventional heterogeneous catalysis. First, the 2D aspect significantly increases the surface area to volume ratio, which is of prime interest to increase surface reactions per volume of materials hence decreasing overall costs. Furthermore, considerations of the catalytic mechanisms of graphene and other 2D materials including molybdenum disulfide ($MoS_2$), tungsten disulfide ($WS_2$) and carbon nitride ($C_3N_4$) have outlined the importance of structural imperfections and other defects. The changes in electronic states introduced by defects foster rich experimental and theoretical endeavors for targeted catalysis by rational material design. As a result, various engineering routes are being considered to tailor electronic structures such as to promote reactivity, including the introduction of dopants, intercalation, and substitutions by physical or chemical treatments. Vacancies, dislocations and grain boundaries, edges, ripples, ridges, wrinkles and crumpled regions bring out new electronic states locally, thus modifying the properties of the pristine material. Catalytic reactions at these different sites are currently under vigorous scrutiny. For instance, Deng et al. reported that edge defects in graphene promote oxygen reduction reaction in alkaline conditions, while Wang et al. found that structural defects promote triiodine reduction in dye-sensitized solar cells. In metal dichalcogenides, it has been shown both theoretically and experimentally that edges constitute active sites for electrochemical $H_2$ evolution. Enhancement of desulfurization activity in $MoS_2$ has been obtained by decorating the edge with cobalt (Co). In addition to graphene and $MoS_2$, defect laden h-BN holds great promise for catalysis despite its wide bandgap in pristine form. Nash et al. demonstrated the role of defect laden h-BN for heterogeneous hydrogenation and computational modeling described nitrogen vacancies $V_N$ as the most potent catalytically active sites. The presence of nitrogen vacancies $V_N$ was recently confirmed experimentally by solid state nuclear magnetic resonance (NMR) and X-ray photoemission spectroscopy (XPS). Defect laden h-BN was since found to capture and convert $CO_2$ and to exhibit photocatalytic properties in the visible range for the dehydrogenation of hydrocarbons and production of hydrogen. Further investigation of the potential interactions taking place at the defect sites was considered using first principles models.

The ability to monitor structural and molecular alterations occurring at the different steps of the reactions at the surface of a catalyst, under conditions that are similar to those taking place in situ in reactor-scale applications, is highly sought after. The reactivity of catalysts is generally assessed using standard analytical methods such as optical spectroscopy (infrared, UV-Visible, fluorescence), XPS or mass spectrometry. While these techniques provide important information on the chemical bonds and electronic transitions changing in the system, the signal collected represent an average of the properties in the volume of the material probed by the instrument for the duration of the measurement. For most of these techniques, the volume is of the order of several micrometer cube or larger, encompassing a significant mass percentage of undisturbed material without active site. As a result, isolating the signature of a local defect and its effect on the local properties of the material is currently lagging. Tools with nanoscale resolving power such as transmission electron microscopy (TEM) can provide a ultrahigh resolution view of the structural changes and lattice structure of the materials, but their application for in-situ chemical analysis of systems such as 2D catalysts has been rather limited. In addition, elemental analysis under vacuum conditions does not suffice to provide the chemical picture of reactions taking place in the system. Scanning probe microscopy (SPM) combines nanoscale resolution, the ability to probe samples under non-vacuum environments and the versatility of exploring functional properties beyond morphology. However, SPM studies of catalysts have mostly considered changes in morphology, leaving functional analyses uncharted. Scanning Tunneling Microscopy (STM) has been used to identify the nature of defect sites and their density of states. In this case, the limitation holds in measurements being carried out under vacuum conditions to reach atomic resolution, with stringent requirements to obtain electron tunneling. The former critically prevents in-operando studies, while the latter restricts the study of wide bandgap 2D materials to configurations involving a metallic support, which has been demonstrated to affect the reactivity of the material. Advances in functional SPM, such as nanoscale infrared spectroscopy (nanoIR) with Atomic Force Microscopy (AFM), can be implemented in controlled environment and temperature, but only a few experimental reports have reported the ability to monitor chemical changes taking place locally, at an active site such as a single atom or a sub-10 nm defect.

The ability to tailor the functionalities of 2D materials for their applications in optoelectronics, catalysis and quantum computing is closely intertwined with defect engineering and environmental conditions. The formation of a defect can affect the material local properties several tens of nanometers around the defect site. In addition, conventional methods to introduce defects in 2D materials do not offer control on their positioning in the material. Advances in the understanding of mechanisms of defect formation, the evolution of their spatial footprint during the initial treatment, and the potential role of surrounding molecules, such as those present in air, on the final chemical nature of defects created in non-vacuum environments are further hindered by the lack of experimental tools with sufficient spatio-temporal resolution for functional analysis, beyond morphology.

As semiconductors and two-dimensional (2D) materials are used in a broad range of applications the ability to tune their properties controllably would greatly benefit both the fundamental understanding of key processes involved in the performance of 2D materials and the ability to produce devices with properties refined for targeted applications.

SUMMARY OF THE INVENTION

In one aspect, the invention provides for a method for introducing a defect into a two-dimensional material comprising:

a.) contacting a surface of the two-dimensional material with a nanoscale tip of a cantilever; and b.) exposing the surface of the two-dimensional material at the site of contact with the nanoscale tip to a laser pulse to introduce a defect in the two-dimensional material.

In certain embodiments of the method for introducing a defect into a two-dimensional material of the invention, the contacting step and the exposing step are performed in an non-vacuum environment. In particular embodiments, the contacting step and the exposing step are performed in a reactive/oxygen containing environment, in an ambient air environment, or in an inert environment. In still other embodiments, the contacting step and the exposing step are performed in an inert environment.

In some embodiments of the method for introducing a defect into a two-dimensional material of the invention, the two-dimensional material is a carbon based material, a hexagonal boron nitride (h-BN) material, an aluminum diboride (A1B2) material, a transition-metal-based dichalcogenide, or a heterostructure comprising two or more different two-dimensional materials.

In other embodiments of the method for introducing a defect into a two-dimensional material of the invention, the laser pulse has a power of about 0.1 mW to about 2.0 mW. In particular embodiments, the laser pulse has a power of about 0.2 mW to about 1.8 mW. In still other embodiments, the laser pulse has a power of about 0.5 mW to about 1.5 mW. In still yet other embodiments, the laser pulse has a power of about 0.8 mW to about 1.3 mW.

In still other embodiments of the method for introducing a defect into a two-dimensional material of the invention, the laser pulse has a wavelength of about 100 nm to about 160000 nm. In particular embodiment, the laser pulse has a wavelength of about 1000 nm to about 10000 nm. In still other embodiments, the laser pulse has a wavelength of about 5000 nm to about 10000 nm. In yet other embodiments, the laser pulse has a wavelength of about 7000 nm to about 8000 nm.

In yet other embodiments of the method for introducing a defect into a two-dimensional material of the invention, the exposure is performed for about 0.1 to 10.0 seconds. In particular embodiments, the exposure is performed for about 1.0 to 5.0 seconds.

In other embodiments of the method for introducing a defect into a two-dimensional material of the invention, the nanoscale tip is a nanoscale infrared tip or an atomic force microscope tip. In particular embodiments, the nanoscale tip is an atomic force microscope tip; and the atomic force microscope tip is a silicon AFM tip, a silicon nitride AFM tip, a silicon oxide AFM tip, a high density carbon AFM tip, a quartz-like AFM tip, a gold coated AFM tip, a platinum coated AFM tip, a platinum/iridium coated AFM tip, a diamond-like-carbon (dlc) coated AFM tip, a diamond coated AFM tip, a conductive diamond coated AFM tip, a cobalt alloy coated AFM tip, a silicon nitride coated AFM tip, or a silicide coated AFM tip.

In still other embodiments of the method for introducing a defect into a two-dimensional material of the invention, the nanoscale tip is an atomic force microscope tip; and the atomic force microscope tip is a 4-sided pyramidal AFM tip, a non-rotated AFM tip, a rotated AFM tip, a 3-sided pyramidal AFM tip, an arrow shaped AFM tip, a square-based pyramid shaped AFM tip, a rectangular-based shaped AFM tip, a casted pyramidal AFM tip, a sharpened pyramidal AFM tip, a plateau AFM tip, a rounded AFM tip, or a spherical AFM tip.

In other embodiments of the method for introducing a defect into a two-dimensional material of the invention, the laser pulse is a pulse from a CO laser, a $CO_2$ laser, a Nd:YAG laser, a frequency doubled Nd:YAG laser, an argon fluoride laser, a xenon chloride laser, a xenon fluoride laser, a helium cadmium laser, a rhodamine laser, a copper vapor laser, an argon laser, a helium neon laser, a krypton laser, a ruby laser, a Ti:sapphire laser, laser diodes, an alexandrite laser, a hydgrogen fluoride laser, an erbium:glass laser, or a pulse from solar illumination.

In still other embodiments of the method for introducing a defect into a two-dimensional material of the invention, the defect is in the form of a triangular-shaped hole or a polygonal-shaped hole.

(d) NanoIR spectra of the pristine basal plane before (black line), during (red line) and after (yellow line) defect formation at the position corresponding to the center of the nanohole in (c). (e) NanoIR spectra corresponding to defect formation obtained at laser power of 0.5 mW (purple line), 0.6 mW (pink line), 0.8 mW (red line) and 1.0 mW (orange line). (f) NanoIR spectra collected at the center of the defect during formation (red line), after defect was exposed to air (red line). NanoIR spectrum collected near the center of the defect after exposure to air (orange line).

Figure 3:
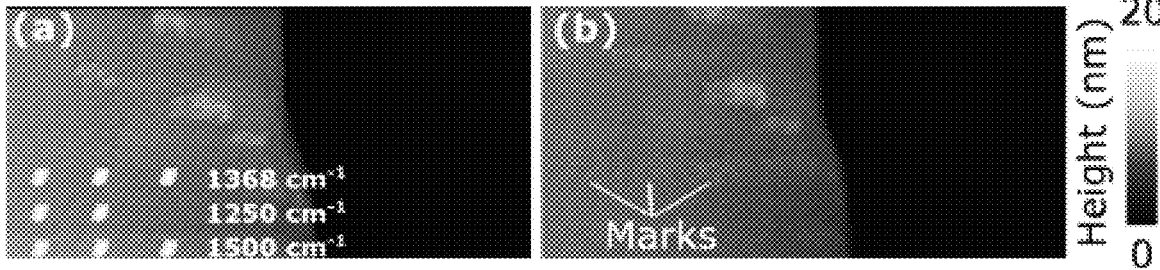

FIG. 3. (a) AFM topography image of h-BN and surrounding Si substrate. The points treated using the AFM-laser scheme are indicated with corresponding wavenumbers used for the laser illumination. Laser power was 0.612 mW. (b) AFM topography image of the same region after AFM-laser treatment showing the formation of small defects on h-B FIG. 4. AMF topography image showing the size of the defects as a function of laser power (0.8 mW, 1.0 mW and 1.3 mW) after exposure to air.

Figure 5:
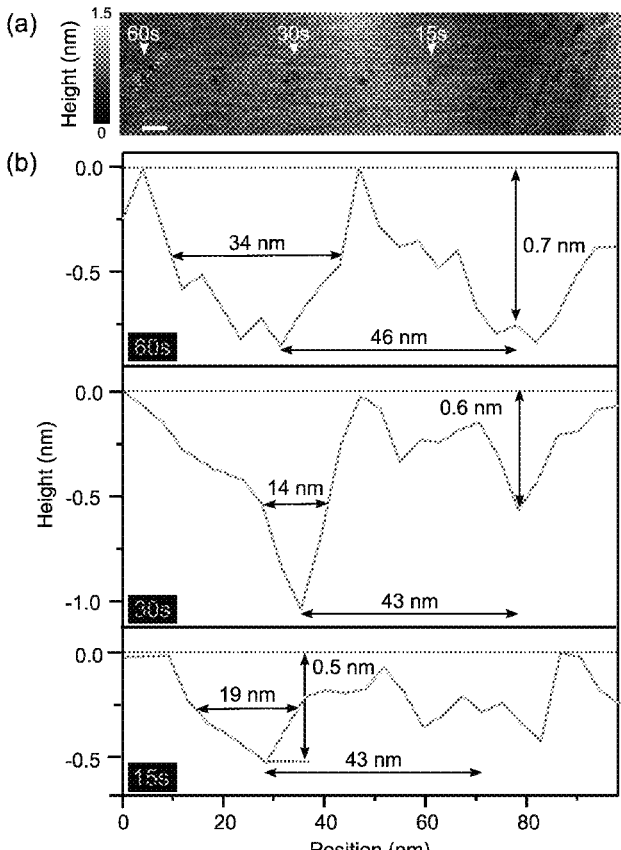

FIG. 5. (a) Tapping mode topography image of defects created in h-BN under $N_2$ using laser wavelength of 1368 cm−1 at 0.24 mW. The duration of exposure was varied from 60 s to 15 s as indicated on the image. (b) Height profiles extracted from each defect.

Figure 6:
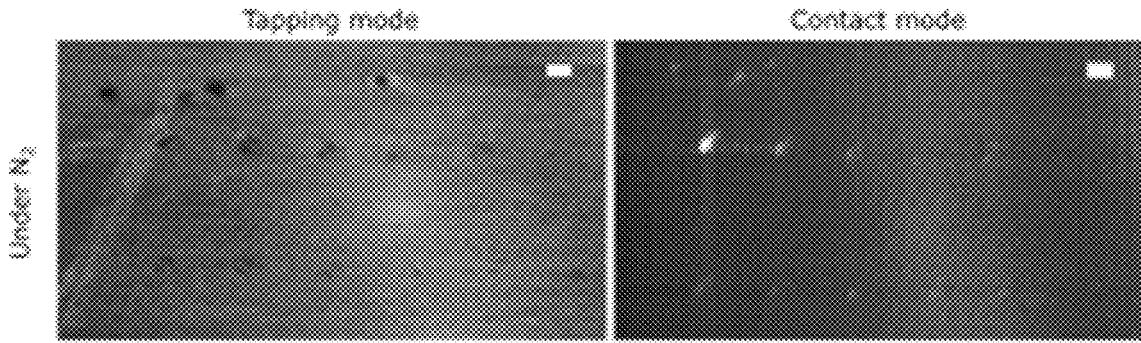

FIG. 6. AMF topography image showing morphology of the nanohole formed in $N_2$ after exposure to air.

Figure 7:
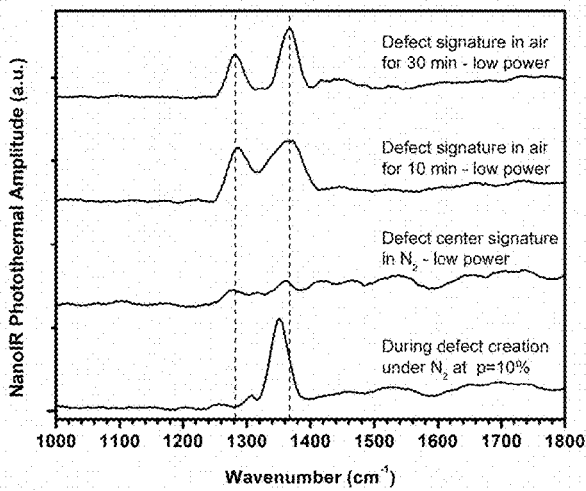

FIG. 7. NanoIR spectra acquired at the defect center: at 1.0 mW during defect creation under $N_2$ atmosphere, and at 0.1 mW after defect creation in $N_2$ then after exposure to air for 10 and min. The dashed lined points the positions of resulting bands (after 30 min of exposure to air) centered at 1282 and 1366 cm−1.

Figure 8:
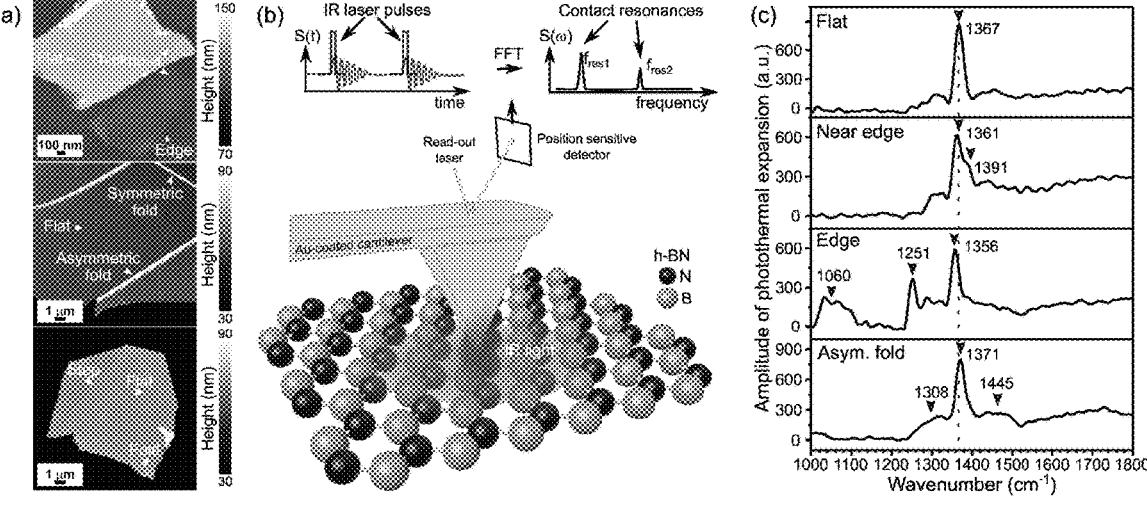

FIG. 8. (a) AFM height images of exfoliated h-BN displaying the various regions and common large defects considered in our study, such as folds, varying thicknesses and unaffected flat regions. (b) NanoIR scheme used for defect formation and analysis. The infrared pulsed laser is focused at the Au-coated AFM tip apex. (c) NanoIR spectra collected at various deformations of the h-BN flakes showing main vibrational mode~1367 cm−1 in pristine h-BN and its shifts attributed to the different deformation probed.

Figure 9:
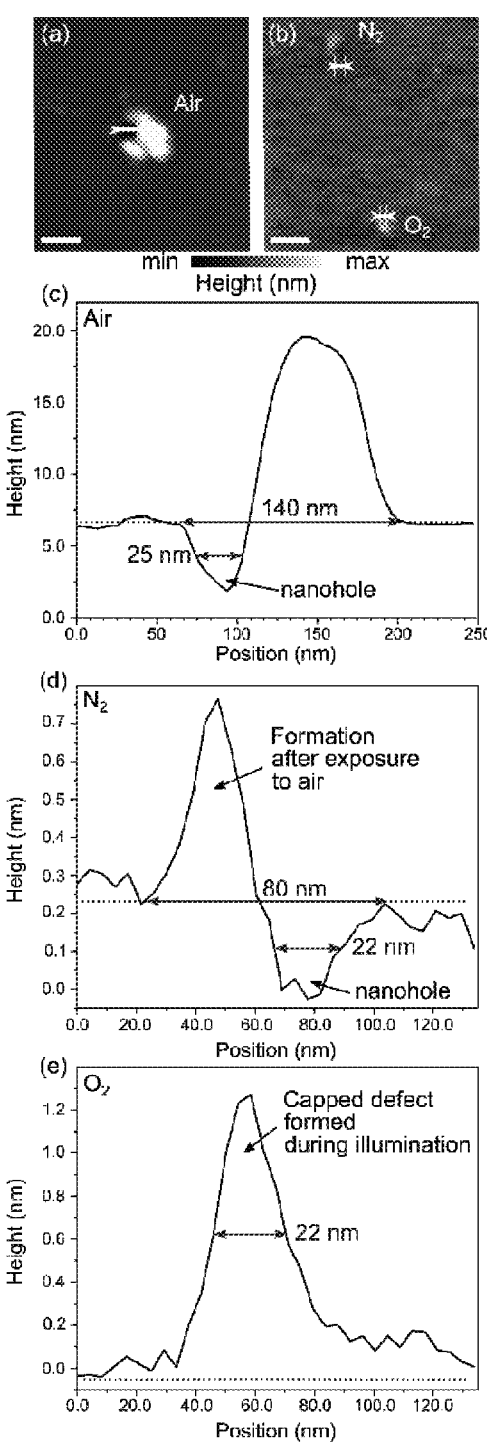

FIG. 9. (a) AMF topography image showing defects created in air, (b) AMF topography image showing defects created in $N_2$ and O2 obtained at power of 0.2 mW. Corresponding height profiles of the defects created in (c) air, (d) $N_2$ and (e) O2. The defects were images after exposure to air. The change in morphology of the defects as a result of exposure to air is indicated in (c) and (d). The defect created under O2 atmosphere was capped during laser treatment and did not evolve after exposure to air.

Figure 10:
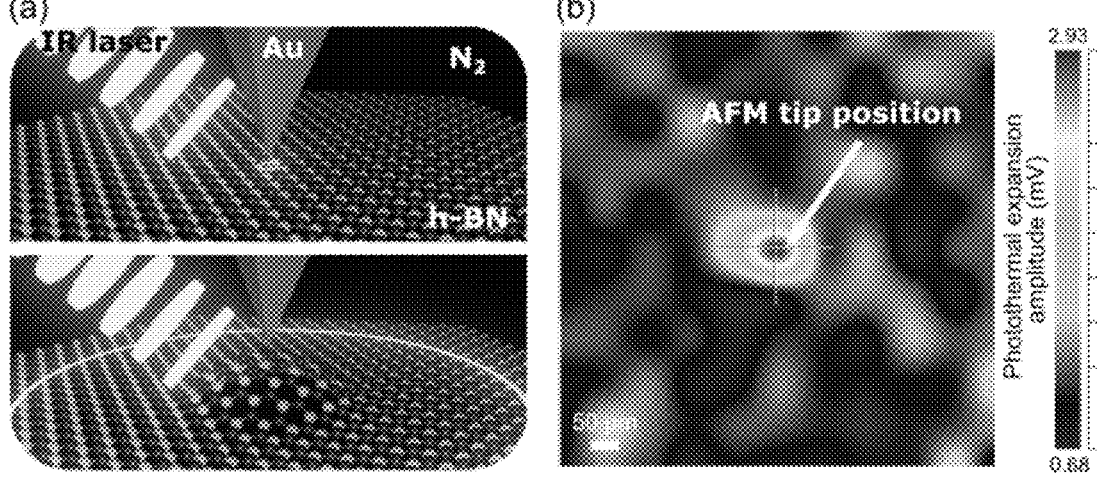

FIG. 10. (a) Nanoscale strain doing by high energy pulsed infrared laser. The Au tip of a cantilever is engaged in contact with pristine flat h-BN layer (top). Upon illumination with the infrared OPO laser under nitrogen environment, a small bump is formed under the tip of the cantilever. (b) AMF topography image showing the position of the tip (~30 nm in diameter) is the center of the laser focal area at the surface of the sample, in the region with maximum signal.

Figure 11:
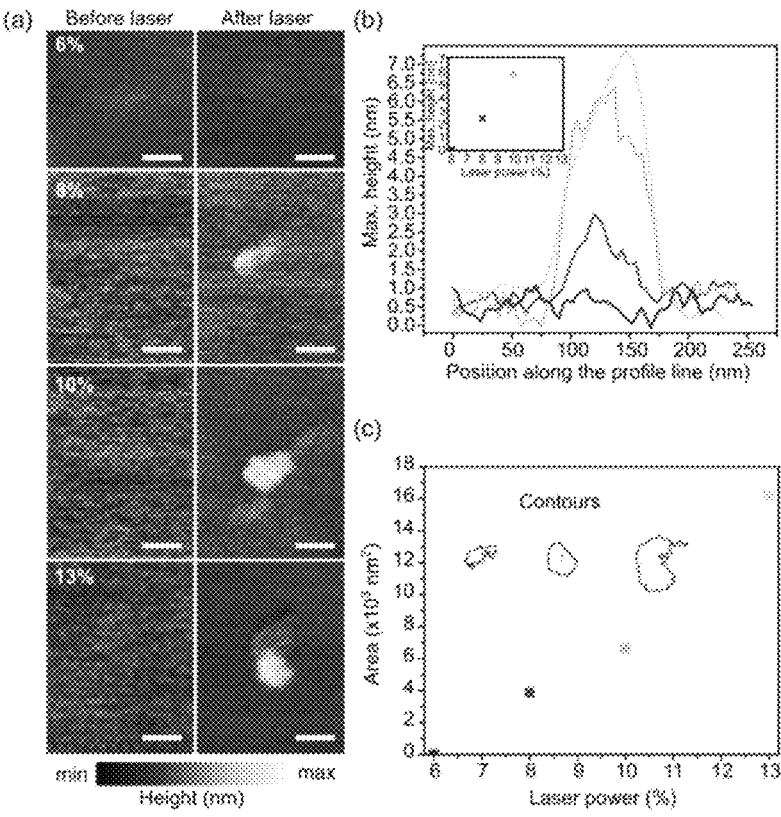

FIG. 11. (a) AFM topography image of the h-BN pristine flake (left column) compared to same region imaged after placing the tip at the center and illuminating it with the infrared laser (right column). The images were collected in contact mode. (b) Height profiles extracted from the highest point of the nanobumps observed in (a). The inset represents the evolution of the maximum height of the deformation as a function of laser power. (c) Evolution of the area of the deformed region in h-BN as a function of laser power. The contours in inset, used for the area calculation, were obtained in ImageJ.

Figure 12:
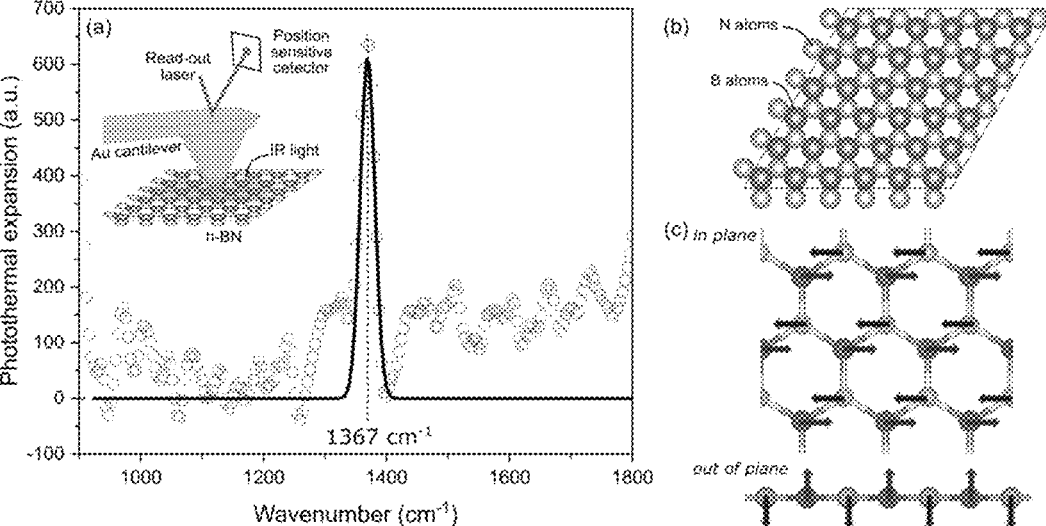

FIG. 12. (a) nanoIR spectrum of pristine h-BN captured monitoring the photothermal expansion of the layer as we function of wavenumber with a Au-coated AFM cantilever, as shown in inset. Gaussian fit (black solid line) indicates the E1u IR-active mode of h-BN centered at 1367 cm−1. (b) 6×6 unit cell containing 36 boron atoms and 36 nitrogen atoms used for DFT calculations. (c) vibrational modes at Γ identified at 1360 cm−1 corresponding to in plane vibrations, and 795 cm−1 corresponding to out of plane vibrations.

Figure 13:
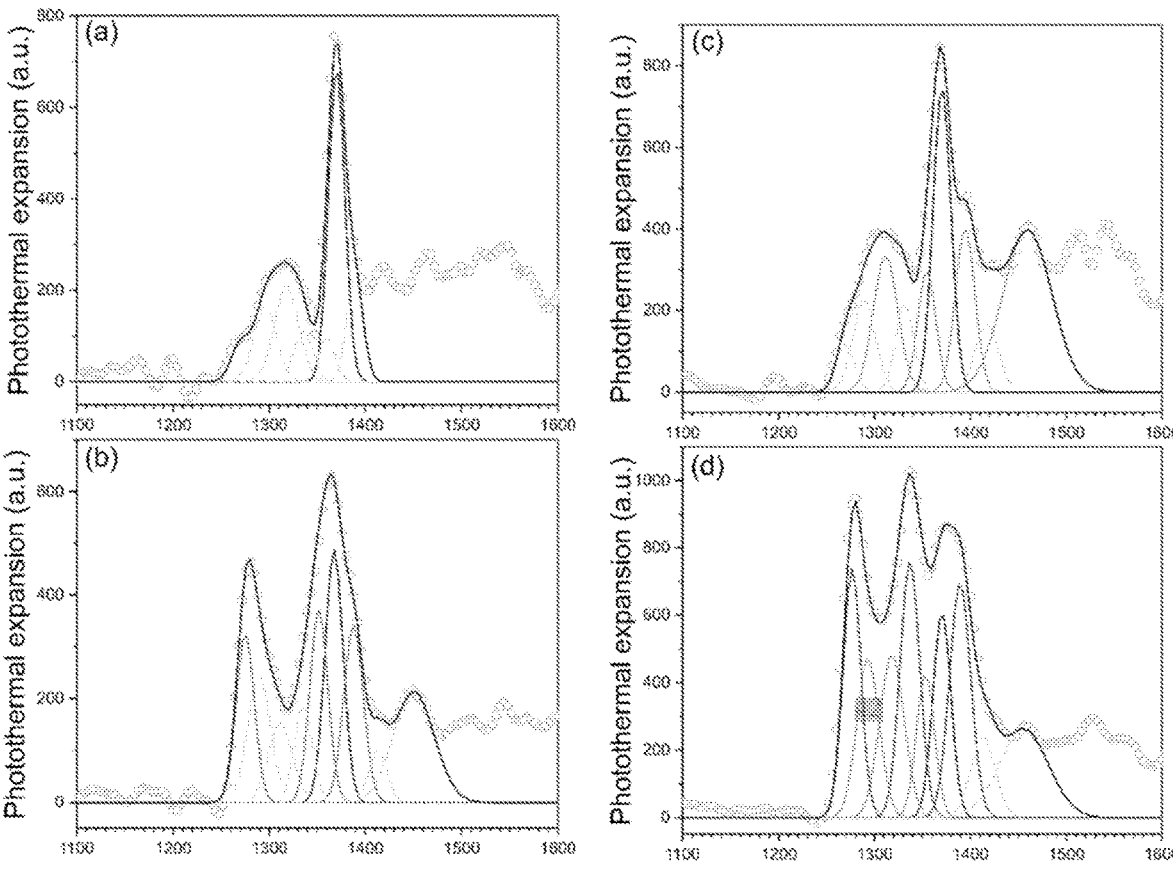

FIG. 13. Nano IR spectra of the deformations in h-BN formed by laser treatment with average power of (a) 0.6 mW, (b) 0.8 mW, (c) 1.0 mW, and (d) 1.3 mW. The red curve indicates the position of the h-BN pristine mode. The gradients of grey indicates top third contributions (solid dark), second third (dashed medium) and last third (dashed light).

DETAILED DESCRIPTION

Conventional approaches to form defects include sintering, high temperatures heating followed by fast quenching, plasma treatment, UV-ozone treatment, or high-power laser treatments. All require significant energy. However, they only allow to control the density of defect, and not the precise position of a given defect. With these methods, it is not possible to pattern arrays of defects.

This disclosure uses a laser pulse to create a defect in the 2D material at the position of the nanoscale tip engaged with the 2D material surface during the treatment. By varying the parameters of laser illumination (laser pulse width, amplitude, repetition rate, wavelength), the coating of the tip (metallic, functionalized with selected molecules), and the environment in the chamber (humidity, selected gases) it is possible to tune the dimensions and composition of the defects. The formation of each defect takes less than 60 s.

The tip can be positioned with nanoscale precision to create arrays or free form designs of nanoscale defects with desired pitch. Larger arrays can be patterned on any substrate coated with the 2D material.

In particular embodiments, the disclosure provides for the use of a nanoscale tip, such as the tip of an atomic force microscopy cantilever, and light to manipulate the environment directly underneath the tip for defect creation. In turn, this approach can be used to pattern arrays of nanoscale defects of selected compositions in 2D materials. The distance between two adjacent defects can be reduced to a few nanometers.

This disclosure circumvents several shortcomings of current methods of defect creations at the nanoscale. First, defects creation in a semiconducting thin film or 2D material, such as hexagonal boron nitride, usually requires heating at high temperatures (about 800° C.) or other high-energy processes (plasma, high power lasers, etc). The defects resulting from these conventional processes are distributed somewhat randomly in the material. In addition, the defects obtained are not necessarily of the same nature and composition, and it is not possible to create two adjacent defects with controlled size and chemistry.

This disclosure uses a laser focused at the tip of an atomic force microscopy to create the defect. The environment of the tip (humidity, gas, solvent), temperature, force applied, and wavenumber can be varied to control the nature of the defect. The coating of the tip can be varied to further control the chemical nature of the defect created. Adjacent structures with variable nanoscale dimensions and various composition, including in patterns with pitch of few nanometers, can be created with this approach.

Certain drawings are attached. For purposes of explanation and illustration, and not limitation, embodiments of a method for the nanoscale creation of functional defects in 2D materials with the ability to control their dimensions and compositions in accordance with the disclosure are described herein with general reference to the attached drawings.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures, and other references mentioned herein are expressly incorporated by reference in their entirety.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

All numerical values within the detailed description and the claims herein are modified by "about" or "approximately" the indicated value, and take into account experimental error and variations that would be expected by a person having ordinary skill in the art.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrases "at least one" and "one or more" in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

"Substantially" or "essentially" means nearly totally or completely, for instance, 95%, 96%, 97%, 98%, 99% or greater of some given quantity.

"Substantially free" refers to the nearly complete or complete absence of a given quantity for instance, less than about 10%, 5%, 4%, 3%, 2%, 1%, 0.5% or less of some given quantity. For example, certain compositions may be "substantially free" of cell proteins, membranes, nucleic acids, endotoxins, or other contaminants.

Where the plural form of the word compounds, salts, polymorphs, hydrates, solvates and the like, is used herein, this is taken to mean also a single compound, salt, polymorph, isomer, hydrate, solvate or the like.

The compounds, compositions and materials according to the disclosure are preferably isolated in more or less pure form that is more or less free from residues from the synthetic procedure. The degree of purity can be determined by methods known to the chemist or pharmacist (see especially Remington's Pharmaceutical Sciences, 18$^{th}$ ed. 1990, Mack Publishing Group, Enolo). Preferably the compounds are greater than 99% pure (w/w), while purities of greater than 95%, 90% or 85% can be employed if necessary.

Throughout this document, for the sake of simplicity, the use of singular language is given preference over plural language, but is generally meant to include the plural language if not otherwise stated. e.g., the expression "A method of treating a disease in a patient, comprising administering to a patient an effective amount of a compound of claim 1" is meant to include the simultaneous treatment of more than one disease as well as the administration of more than one compound of claim 1.

It should also be understood that, in certain methods described herein that include more than one step or act, the order of the steps or acts of the method is not necessarily limited to the order in which the steps or acts of the method are recited unless the context indicates otherwise.

Method

In one aspect, this disclosure provides for a method for the controlled formation of defects in a 2-dimensional (2D) material. In certain embodiments the 2D material is a carbon based material, including but not limited to, graphene. In certain embodiments, the 2D material is hexagonal boron nitride (h-BN) or aluminum diboride (A1B2). In still other embodiments, the material includes a transition-metal-based dichalcogenide in 2D layer form. In still other embodiments, the material includes heterostructures, including, but not limited to, a stack of different 2D materials.

In the method of this disclosure, defects are formed by first introducing local strain in a 2D material using a high energy pulsed laser focused at the nanoscale tip of a microcantilever.

In certain embodiments, the nanoscale tip is a nanoscale infrared tip or an atomic force microscope tip. In embodiments using an AFM tip, the AFM tip can be a silicon AFM tip, a silicon nitride AFM tip, a silicon oxide AFM tip, a high density carbon AFM tip, or a quartz-like AFM tip. In certain embodiments, the AFM tip can be an uncoated AFM tip or a coated AFM tip (including but not limited to gold coated AFM tips, platinum coated AFM tips, platinum/iridium coated AFM tips, diamond-like-carbon (dlc) coated AFM tips, diamond coated AFM tips, conductive diamond coated AFM tips, cobalt alloy coated AFM tips, silicon nitride coated AFM tips, and silicide coated AFM tips). In certain embodiments, the AFM tip shape may be a 4-sided pyramidal AFM tip, a non-rotated AFM tip, a rotated AFM tip; a 3-sided pyramidal AFM tip, an arrow shaped AFM tip, a square-based pyramid shaped AFM tip, a rectangular-based shaped AFM tip, a casted pyramidal AFM tip, a sharpened pyramidal AFM tip, a plateau AFM tip, a rounded AFM tip, or a spherical AFM tip. In particular embodiments, the nanoscale tip is a gold coated AFM tip.

The method may be performed in a reactive/oxygen containing environment, including but not limited to ambient air, or in an inert environment. In certain embodiment, the method is performed in an inert environment. In particular embodiments, the method is performed under a nitrogen environment.

Suitable light sources include, but are not limited to, a CO laser, a CO$_2$ laser, a Nd:YAG laser, a frequency doubled Nd:YAG laser, an argon fluoride laser, a xenon chloride laser, a xenon fluoride laser, a helium cadmium laser, a rhodamine laser, a copper vapor laser, an argon laser, a helium neon laser, a krypton laser, a ruby laser, a Ti:sapphire laser, laser diodes, an alexandrite laser, a hydgrogen fluoride laser, an erbium:glass laser, or solar illumination.

The power of the laser used in the disclosed method can be controlled. In certain embodiments, the power of the laser is from about 0.1 mW to about 2.0 mW. In some embodiments, the wavelength is from about 0.5 mW to about 1.5 mW. In other embodiments, the wavelength is from about 1.0 mW to about 1.3 mW.

The wavelength of the laser used in the disclosed method can also be controlled. In certain embodiments, the wavelength of the laser is from about 100 nm to about 16000 nm. In some embodiments, the wavelength is from about 5000 nm to about 10000 nm. In other embodiments, the wavelength is from about 7000 nm to about 8000 nm.

The exposure time used in the disclosed method can also be controlled. In certain embodiments, the exposure time is from about 0.1 to 10.0 seconds. In some embodiments, the wavelength is from about 1.0 to 5.0 seconds. In other embodiments, the wavelength is from about 2.0 to 3.0 seconds.

By controlling the laser power, wavelength, duration of exposure, and local environment, the defect formed can be controlled to parameters desired by the user.

The defects produced by the methods of the disclosure can range in size and shape. In certain embodiments, the defects produced by the methods of the disclosure have an average diameter of about 0.1 nm to about 500 nm. In some embodiments, the average diameter is from about 1 nm to about 300 nm. In other embodiments, the wavelength is from about 10 nm to about 200 nm.

As detailed above, the size and shape of the defects produced by the methods of the disclosure can further be adjusted by varying the tip, force and environment (air, or other gas); the laser power and time of exposure; and the time of exposure.

Applications

The disclosed method can be used to produce 2D materials for use in a number of ways, including but not limited to use: as quantum emitters; as sensors, including, but not limited to quantum sensors; as plasmonic structures; as 2D catalysts; as nanomembranes or nanofilters; and in biological applications, including but not limited to genome sequencing.

In some embodiments the method achieved is in the form of a printing machine adapted for the preparation of 2D material structures.

Examples

Example 1—Defect Formation in Hexagonal Boron Nitride

Defect Formation and Chemical Analysis

Figure 1:
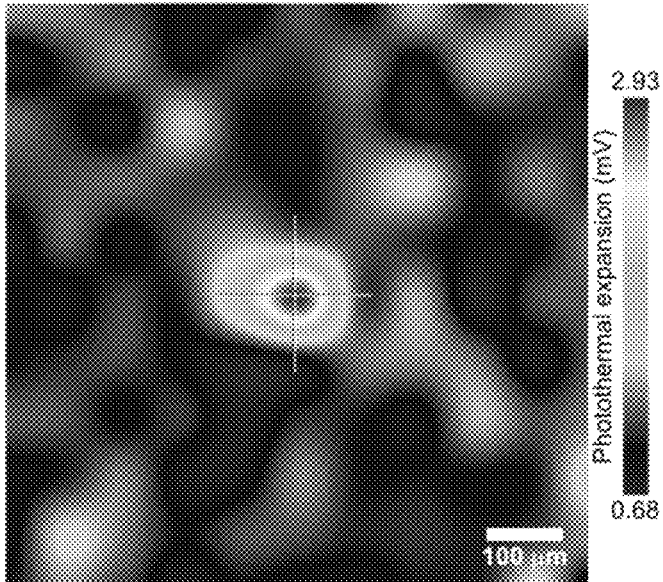
FIG. 1. Representation of the region of a sample illuminated by the OPO laser beam profile focused with a gold-coated spherical mirror in the plane of the sample. The tip of the AFM cantilever is positioned at the center of the region, as marked by the cross. The tip radius of the cantilever used for nanoIR spectroscopy is 20 nm, which is significantly smaller than the central region shown in red in the map.

Nanoscale measurements were carried out on a commercial NanoIR2 AFM platform (Bruker, Santra Barbara, CA), equipped with an optical parametric oscillator (OPO) laser pulsed at ~1 kHz (~10 ns width) emitting in the infrared range between 1800 and 1000 cm$^{-1}$. The alignment of the laser, obtained through top-side illumination using a succession of Au-coated mirrors, was optimized for the focal point to be aligned with the cantilever tip (PR-EX-nIR2). Optimization of the alignment indicated a lateral beam size of the IR focal point of about 50 μm (FIG. 1). Despite the micrometer-size laser spot, the detection scheme using the cantilever tip makes it possible to detect local variations below 100 nm. The IR spectra were collected at a fixed point by measuring the amplitude of the contact resonance of the cantilever while scanning the illumination wavelength. Spectra were filtered with a Loess (0.05) in Origin. Chemical maps were acquired by fixing the illumination wavelength and scanning the area of interest. Measurements were performed at room temperature in air, nitrogen or oxygen environments. In air, the relative humidity at ambient was ~30%. The nitrogen and oxygen environments were obtained by purging the AFM chamber with a constant gas flow that was optimized not to disturb the measurements. The chamber was first flushed with nitrogen to attain relative humidity of ~5%. Once the relative humidity reached ~5%, sufficient time (~20-30 min) was provided for the system to equilibrate prior to carrying out the measurements. Oxygen was introduced to the equilibrated nitrogen-filled chamber.

Results

Figure 2:
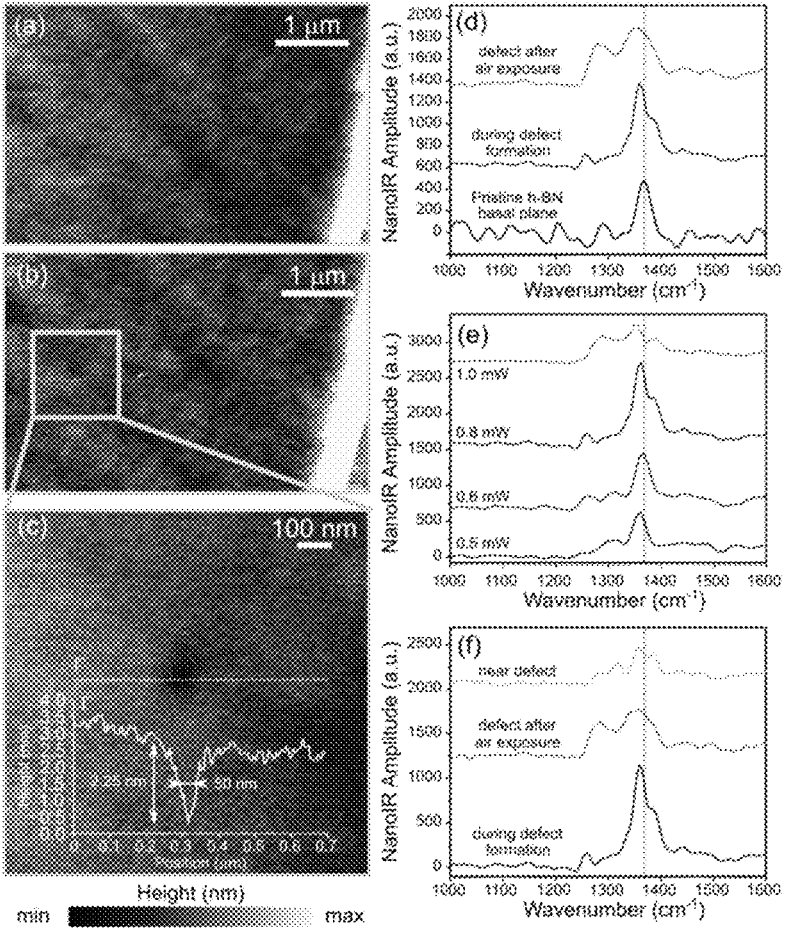
FIG. 2. AFM topography of h-BN basal plane (a) before and (b) after laser-induced defect formation at 0.8 mW in air. (c) higher resolution AFM topography of the defect. The height profile of the laser-induced nanohole defect formed along Γ is presented as an inset, showing the full width at half minimum (FWHM) of 50 nm and a depth of 2.25 nm.

Selected laser illumination conditions illuminating the nanoIR tip interacting with h-BN leads to the controlled formation of local defects in the basal plane of pristine flakes. The first flake considered here was 6-nm thick. Measurements were initially carried out in air. A nanoIR spectrum of the basal plane of the flake was collected at the lowest possible laser power (0.1 mW). This was confirmed to be below the threshold for defect formation observed in all flakes considered: the single TO mode centered at 1367 $cm^{-1}$ was resolved without signs of deformation or contamination. Next, the same point was exposed to short laser exposure (few seconds) at a power of 0.8 mW. The illumination wavelength was spanned from 1000 to 1600 $cm^{-1}$ and the resulting photothermal expansion was recorded. As shown in FIG. 2d (red spectrum), the spectrum exhibits a shift of the prominent peak to 1360 $cm^{-1}$ and a secondary peak at 1386 $cm^{-1}$, suggesting some strain in the lattice upon illumination as discussed by Lyu et al. AFM topography images collected after the laser treatment revealed the formation of a nanohole about 2.25 nm deep and 50 nm in width (FWHM) (FIG. 2b,c). An additional nanoIR spectrum was collected several minutes after the nanohole was formed, with low laser power to prevent disturbing the defect further. Interestingly, the spectral signature of the defect exhibited significantly different features with two prevalent broad bands centered at 1280 $cm^{-1}$ and 1355 $cm^{-1}$, and a secondary peak at 1386 $cm^{-1}$ present as a shoulder of the latter. The band centered at 1280 $cm^{-1}$ is assigned to TO mode in vitreous boron trioxide (v-$B_2O_3$) while vibrations at 1355 $cm^{-1}$ have previously been assigned to an asymmetric stretch of B—O. These suggest different environments are present at the edges (B—OH) and in the vicinity of the nanohole resulting from light-assisted disruption of h-BN in air at ambient conditions (B—O). The nanoIR spectrum collected a few nanometers away from then the edge of the nanohole (FIG. 2f, yellow line) also shows that the disruption of the lattice is not contained to the nanohole but extends to a region that depends on the power used for the illumination. Nonetheless, the region affected was found to remain below ~100 nm for laser power <1.0 mW.

The significant difference in the dimension of the region illuminated by the laser focused on the surface of the sample with the spherical mirror (~50-100 μm long and ~50 μm wide, shown in FIG. 1) and the size of the nanohole (FWHM~50 nm, shown in FIG. 2c) indicates that the defect formation in the basal plane of h-BN originates from the interplay of light interacting with the Au-coated tip, and environment in the vicinity of the AFM tip. The role of the metallic coating of the AFM tip was also confirmed by repeating the same process with a conventional silicon nitride cantilever tip of similar stiffness. No defect or disruption of the h-BN layers could be observed under identical conditions of light treatment and environment.

Figure 4:
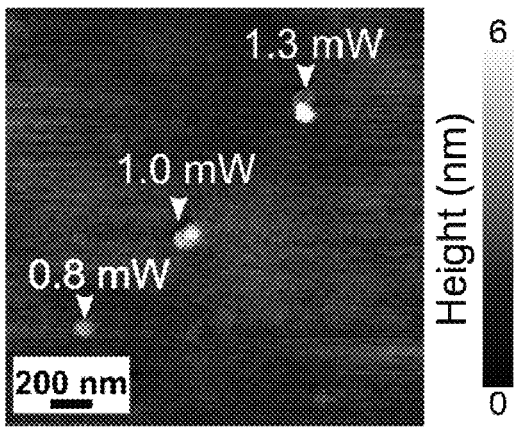

In addition, this example shows that, in the case of h-BN, illumination wavelengths close to 1367 $cm^{-1}$ were the only ones leading to the formation of nanoholes in the basal plane of h-BN that could be resolved in AFM topography images (FIG. 3). Overall, these observations suggest that the light-induced nanoscale defect creation in h-BN discovered in this work is likely promoted by the polarization of charges at the tip of the Au-coated cantilever, also referred to as lightning-rod effect, accompanied by the vibration of phonon in the lattice especially in the environment under the tip. In ambient conditions, the region under the tip is known to hold a water meniscus. Increasing the laser power from 0.5 to 1.0 mW (FIG. 2e) seemed to accelerate reactions with molecules present in the meniscus at the tip-sample interaction region. At 1.0 mW, bands corresponding to v-$B_2O_3$ could already be resolved during the defect formation, suggesting that the reaction between the deforming B—N bonds and the reactive species ($O_2$ or $H_2O$ in air) could take place before or during the short time the laser illuminated the region. Treatments carried out at 1.0 and 1.3 mW not only formed B—O faster, but also resulted in larger defects (FIG. 4).

The same procedure was repeated after purging the AFM chamber with $N_2$. In this case, nanoholes were formed, even with laser power as low as 0.24 mW (FIG. 5). When compared to nanoholes formed with identical laser power, the nanoholes created under $N_2$ environment were much smaller than those obtained in air. Tapping mode imaging of the freshly formed defects (i.e., no exposure to air) suggested the presence of two nanoholes around the position of the tip, similar to a double well. However, imaging of the same defects with contact mode returned the topography of a single nanobump (FIG. 6). Without being bound by theory, it is believed that the atypical behavior may be due to residual charges in the defect formed, which could not be captured with the sensitivity of the setup. Force curve measurements acquired across the double-well did not reveal any notable difference in the tip-sample interaction. When reducing the exposure time, the double-well formation was retained as well as the spacing between the two well centers (~43 nm), which corresponds to the diameter of the AFM tip. The dimension of the nanohole decreased. The smallest two defects detected were ~20 nm in diameter, separated by ~43 nm. The morphology of the nanoholes formed under $N_2$ remained stable while maintaining the chamber free from air molecules.

Changes in the chemical signature were detected at a defect site formed in $N_2$, as a function of exposure time to air (FIG. 7). The spectra acquired at the same location during and immediately after formation under $N_2$. The nanoIR spectrum recorded under $N_2$ during laser illumination at 1.0 mW presents a symmetric peak centered at 1351 $cm^{-1}$. The observed band presents a shift of 16 $cm^{-1}$ (as compared with pristine h-BN), similar to the band shift observed at the edge of exfoliated flake (FIG. 8c). This shift is a reliable indication of the formation of defects in the basal plane under the condition considered in this study. After defect formation, the nanoIR spectrum recorded in $N_2$ at low power shows the vanishing of the observed band. This degradation of the vibrational behavior of the flake highlights a significant damage (i.e., deformation followed by the formation of a hole) produced by the laser irradiation. After 10 min of exposure to air, the nanoIR spectrum of the same point indicated the emergence of two major bands located at 1366 and 1282 cm$^{-1}$. While the first band (1366 cm$^{-1}$) corresponds to h-BN, the band centered at 1280 cm$^{-1}$ is assigned to the TO mode of v-B$_2$O$_3$. This suggests that exposure of the defect to air brings about a local reaction, in this case an oxidation of h-BN and lattice reconstruction, which exhibits the morphology of a nanobump evolving over time (FIG. 7). The absence of the band at 1120 cm$^{-1}$ as observed for the edges and corners of exfoliated flakes, indicates differences in the vibrational behavior with laser-induced defects.

Lastly, for comparison, the same parameters were used to create defects after introducing O$_2$ in the chamber. Similarly, a nanoscale defect (FWHM~22 nm) was created, though with a capped profile that is different from that of the double well structure obtained under N$_2$ (FIG. 9). The presence of oxygen in the chamber seems to lead to immediate reaction of oxygen with the BN lattice, which results in a feature that is different from the defect formed under oxygen-free environment followed by exposure to air. The reaction of local defects with oxygen species is in agreement with reports that have shown the passivation of defect-laden h-BN leading to the evolution of fluorescence upon exposure of fresh defects to air.

Conclusion

The ability of manipulate light-matter interaction at the tip of an AFM is also highlighted. In particular, a light-assisted method to introduce defects in the basal plane of h-BN is described, which provides a controlled approach for defect engineering in 2D materials. The morphology and chemical makeup of the engineered defects can be controlled by varying parameters such as laser power, wavelength, duration of exposure, and local environment around the AFM tip. In addition, the findings shine light on the important role of the water meniscus formed under the AFM tip when operated in ambient conditions. It is expected that by modifying the composition of the local environment, new defect functionalization will be possible, beyond the oxidation reaction observed in this work. Lastly, the creation of the nanosized defects results from a succession of lattice deformation of the site have been demonstrated, which continues to evolve after the initial illumination depending on the nature of the defect and on the environment interacting with the defect. The ability to monitor changes in the local infrared fingerprints over time with higher temporal resolution is currently lacking but is expected to reveal important steps that constitute the missing feedback to theoretical models reported in the literature. Controlling the environment at the surface of the sample will make it possible to tune the dimensions and chemical properties of the defect sites for targeted applications such as nanoelectronics, quantum sensing and beyond.

Example 2—Controlling the Introduction of Local Strain in Hexagonal-Boron Nitride with Atomic Force Microscopy Defects can be introduced during or after growth. Bayer et al. found that the width of grain boundaries in h-BN can be manipulated by reducing the pressure of a N-containing gas pretreatment during chemical vapor deposition (CVD) growth. Processes involving plasma etching or patterning with ultrafast lasers have been reported to modify materials after growth. These methods provide the ability to create lattice deformations such as vacancies, few-nanometer holes, or atomic substitution in the lattice, in large quantities of powder or wafer-scale layers of 2D materials. However, the position of defects with properties of interest, such as single photon emitters or spin centers, cannot be controlled with such engineering approaches. Random distribution and lack of control of the distance between adjacent functional defects constitute significant drawbacks in view of scalable manufacturing for a targeted application. Furthermore, the nature of the defects obtained using these methods remains poorly understood.

On the other hand, particle irradiation with electron or ion beams has been used to position defects more controllably at the atomic scale. By thinning a few-layer thick suspended h-BN flake by electron beam, Jin et al. accounted for the types of defects present in the remaining monolayer. At the single-atom vacancies level, only boron vacancies could be found. In addition, triangular holes of finite dimensions with identical orientations were obtained. Pham et al investigated the atomic structure of defects formed in h-BN with aberration corrected transmission electron microscope as a function of temperature. They demonstrated that the size and atomic arrangement of the defects can vary from triangular-shaped holes when heating below 500° C. to slightly larger polygonal-shaped holes at higher temperature. However, electron and ion beams are commonly operated in vacuum, which makes it impractical to implement the reported process for large scale production.

Beside high energy irradiation, strain has been reported as a mean to introduce local doping in 2D layer. Carmen Palacios-Berraquero et al. demonstrated that placing monolayers of tungsten diselenide and tungsten disulfide on top of a silica nanopillar of diameter ~150 nm provides the deformation needed to generate the quantum confinement of excitons in the material, which is needed to form single photon emitters. By designing an array of nanopillars using common nanofabrication processes, it is then possible to control to positions and density of quantum emitters in the 2D layers. With h-BN, Mendelson et al. demonstrated that controlling the strain in CVD grown h-BN provides a tuning window of 65 meV in the optical properties of the single photon emitters, which is superior to other quantum emitters obtained from 2D materials. However, there are limitations in producing controlled strain locally. No structure with diameter below 500 nm has been reported to date.

This example demonstrates that it is possible to introduce local strain in h-BN using a high energy pulsed laser focused at the nanoscale tip of a microcantilever, under nitrogen environment. In particular, the dimensions of the nanoscale bumps are a function of laser power.

Using nanoscale infrared (IR) spectroscopy, local changes in lattice vibration in h-BN are studied. The experimental observations are supported by first-principle calculations of strained h-BN layers, which reveal that strain of the pristine lattice alone affects the bandgap but does not introduce new states. However, the deformation is accompanied by changes in the in-plane E$_{1u}$ IR-active modes of h-BN, which is in excellent agreement with the experimental findings.

Strain doping was achieved using a gold (Au)-coated AFM tip (PR-EX-nIR2) and light to locally deform the surface of the h-BN flake. An optical parametric oscillator (OPO) infrared laser was focused on the h-BN surface using a gold coated curved mirror and aligned so that the tip of the AFM is located in the area of maximum power (FIG. 10). FIG. 10($a$) represents the process of illuminating h-BN with the pulses of light while the cantilever tip is engaged in contact mode with the surface under nitrogen environment (N$_2$). The measurements were carried out with a OPO pulse of with pulse energy below 2μJ. A representative picture of the shape and dimension of the OPO focal spot on the sample is depicted in FIG. 10($b$). The map was obtained by engaging the cantilever in contact with the sample and tuning the laser emission at a wavenumber corresponding to an absorption band of the sample. The laser pulse excites flexural modes of the cantilever, which can be monitored in the time domain and analyzed by Fourier Transform. In the frequency domain, several modes are observed, corresponding to the contact resonances of the cantilever. To obtain the map in FIG. 10(*b*), the amplitude of the first resonance of the cantilever was monitored while sweeping the position of the curved mirror steering the infrared laser to the AFM tip. The elliptical shape observed corresponds to the projection of the laser beam angled at ~30° with respect to the plane of the sample. The focal spot presented in FIG. 10(*b*) exhibits an elliptical shape, with width of ~50 μm and length of ~300 μm. The light was aligned for the tip of the cantilever to be close to the center of the focal area, as shown in FIG. 10(*b*).

The h-BN flakes used were about 40 nm in thickness and were deposited on a IR transparent zinc sulfide substrates by mechanical exfoliation. Samples were cleaned by thermal annealing (200° C.) to remove glue residues, before being placed in the AFM chamber purged with nitrogen ($N_2$). The choice of mechanical exfoliation and gentle cleaning procedures was made to limit the introduction of defects, which could themselves play the role of reaction centers. It has previously been shown that h-BN grown by chemical vapor deposition (CVD) results in the presence of grain boundaries and residues from the transfer process. These constitute defects of different structures and composition, which are not well understood in terms of their density of states and their effect on the pristine lattice. Such defects could behave differently under the laser treatment used in this work. On the other hand, mechanical exfoliation is known to introduce some vacancies in the surface layers of the exfoliated crystal, but the presence of grain boundaries and impurities from precursors and transfers are avoided.

The AFM tip was engaged with the surface of h-BN in contact mode upon light exposure. In the present work, the OPO emission was tuned from 900 to 1800 cm$^{-1}$ for 128 co-averages, which determined the time of exposure. The laser power was varied from 0.6 to 1.3 mW. For each power, the tip was moved to a new location. Each region was imaged before illumination (FIG. 11(*a*), left column) and after illumination (FIG. 11(*a*), right column). At laser power of mW, no deformation was observed in the flake at the scale considered. After increasing the laser power to 0.8 mW, the first signs for deformation were observed in the lattice. A profile across the highest region of the bump revealed a height of 57 nm. The region affected by the deformation increased when using laser powers of 1.1 and 1.3 mW. The largest bump observed at 1.3 mW exhibited a width at the base of 76 nm and a maximum height of about 7 nm. Width values were determined by performing the first derivative of the profile extracted across the highest point of the feature and recording of position of largest slope for each curve. Overall the data reveals a non-linear increase of the strain introduce in the material with increasing power beyond laser power of 1 mW, as shown in the inset of FIG. 11(*b*). The images were further analyzed using thresholding in Image J to estimate the area of the deformed regions. The contours obtained for each nanobump is provided as inset in FIG. 11(*c*). The area of the features increased significantly with laser power, but resulted in more irregular shapes.

The small size of the deformations (below 100 nm in diameter) compared to the size of the focused laser beam on the same plane (50 mm or more) indicates that the process is driven by the change in environment under the tip, in conjunction with the light and the nitrogen environment. The Au coating of the tip serves as a reflector of the incoming light to prevent undesired flexural bending of the microcantilever due to the light interacting with the cantilever arm, to provide high sensitivity in measuring of the photothermal expansion of the sample during nanoinfrared (nanoIR) spectroscopy measurements. It has been shown by various group that gap-mode measurements with nanoIR can be used to increase the limit of detection of nanoIR, especially for small molecules. In the present study, the measurements are not carried out in gap mode, as the h-BN flake is rather thick (40 nm or more), but the formation of the nanobump indicates that the tip can be used to introduce local strain in h-BN.

Experimentally, the investigation of the IR signature of the nanobumps can only be achieved with nanoIR spectroscopy due to the dimension of the features. The $E_{1u}$ mode at ~1360 cm$^{-1}$ was the only mode that could studied due to the laser range available. The spectra collected at the center of each defect are presented in FIG. 1. The signatures reveal local changes in the vibrational modes of the lattice, dependent on laser power. At illumination below 0.6 mW, the only band observed was that of the basal plane of h-BN centered at 1367 cm$^{-1}$ (FIG. 1(*a*)). When increasing the laser power and collecting a nanoIR spectrum on a new region of the flake, additional bands were observed. At an average power of 0.6 mW, the main h-BN vibrational mode centered at 1367 cm$^{-1}$ (FIG. 12) observes a slight shift to 1370 cm$^{-1}$, but a low intensity side band centered at ~1389 cm$^{-1}$ indicates disruption of the lattice, as observed in the AFM topography image in FIG. 1. At laser power of 0.8 mW, additional side bands are required to describe the broader band. These include two side bands centered at ~1388 cm$^{-1}$ and ~1352 cm$^{-1}$ with intensity comparable to that of the $E_{1u}$ h-BN mode at 1370 cm$^{-1}$, as well as several peaks with smaller intensities at 1450 cm$^{-1}$, 1413 cm$^{-1}$, 1336 cm$^{-1}$, 1312 cm$^{-1}$, 1289 cm$^{-1}$ and 1275 cm$^{-1}$. The spectrum of the area illuminated with average power of 1.3 mW exhibited significantly different distribution of the IR signal with the strongest peaks centered at ~1389 cm$^{-1}$, ~1337 cm$^{-1}$ and ~1276 cm$^{-1}$, well above the $E_{1u}$ h-BN mode at 1370 cm$^{-1}$, accompanied by lower intensity peaks at 1413 cm$^{-1}$, 1353 cm$^{-1}$, 1318 cm$^{-1}$, and 1293 cm$^{-1}$ (FIG. 13).

Conclusion

In summary, the mid-infrared light treatment of the h-BN film introduces a change in the inter-atomic bond length in the treated regions, that concludes in a deformation of the basal plane of the pristine h-BN layers. Without being limited by theory, local changes in h-BN properties are a result of the effect of strain on the IR mode of a h-BN monolayer. Despite the multi-layer nature of the h-BN crystal used for the experimental measurements, comparison of the nanoIR spectra collected at the center of the nanoscale deformation to the theoretical models of strained h-BN reveals that the nanoscale feature encompasses local strain in the range of ±1.5%.

It is expected that the deformation is present in subsurface layers, possibly with a gradient as a function of depth, though resolving nanoscale subsurface morphology and deformation local and non-destructively is not currently possible with nanoscale imaging tools.

INCORPORATION BY REFERENCE

The entire contents of all patents, published patent applications and other references cited herein are hereby expressly incorporated herein in their entireties by reference.

LIST OF REFERENCES

[1] a) K. S. Novoselov, A. K. Geim, S. V. Morozov, D. Jiang, M. I. Katsnelson, I. V. Grigorieva, S. V. Dubonos, A. A. Firsov, Nature 2005, 438, 197; b)A. H. Castro Neto, F. Guinea, N. M. R. Peres, K. S. Novoselov, A. K. Geim, Rev. Mod. Phys. 2009, 81, 109.

[2] Q. H. Wang, K. Kalantar-Zadeh, A. Kis, J. N. Coleman, M. S. Strano, Nat. Nanotechnol. 2012, 7, 699.

[3] a)Y.-J. Huang, H.-C. Chen, H.-K. Lin, K.-H. Wei, ACS Appl. Mater. Interfaces 2018, 10, 20196; b)Z. Yu, L. Tetard, L. Zhai, J. Thomas, Energy & Environ. Sci. 2015, 8, 702; c)F. Yi, H. Ren, J. Shan, X. Sun, D. Wei, Z. Liu, Chem. Soc. Rev. 2018, 47, 3152.

[4] B. Pradhan, S. Das, J. Li, F. Chowdhury, J. Cherusseri, D. Pandey, D. Dev, A. Krishnaprasad, E. Barrios, A. Towers, A. Gesquiere, L. Tetard, T. Roy, J. Thomas, Sci. Adv. 2020, 6, eaay5225.

[5] J. Zhang, R. Sun, D. Ruan, M. Zhang, Y. Li, K. Zhang, F. Cheng, Z. Wang, Z.-M. Wang, J. Appl. Phys. 2020, 128, 100902.

[6] D. J. Nash, D. T. Restrepo, N. S. Parra, K. E. Giesler, R. A. Penabade, M. Aminpour, D. Le, Z. Li, O. K. Farha, J. K. Harper, ACS Omega 2016, 1, 1343.

[7] F. E. Torres-Davila, K. L. Chagoya, R. G. Blair, L. Tetard, Application No.: 63/219,333 2021.

[8] F. E. Torres-Davila, K. L. Chagoya, L. R. Shultz, C. Geiger, Z. Chang, T. Jurca, R. G. Blair, N. Rochdi, L. Tetard, under review 2021.

[9] T. T. Tran, K. Bray, M. J. Ford, M. Toth, I. Aharonovich, Nat. Nanotechnol. 2016, 11, 37.

[10] a)T. Vogl, R. Lecamwasam, B. C. Buchler, Y. Lu, P. K. Lam, ACS Photonics 2019, 6, 1955; b)T. T. Tran, D. Wang, Z.-Q. Xu, A. Yang, M. Toth, T. W. Odom, I. Aharonovich, Nano Lett. 2017, 17, 2634.

[11] A. T. Bell, Science 2003, 299, 1688.

[12] R. Peter, A. Bozanic, M. Petravic, Y. Chen, L.-J. Fan, Y.-W. Yang, J. Appl. Phys. 2009, 106, 083523.

[13] Z. Q. Xu, C. Elbadawi, T. T. Tran, M. Kianinia, X. Li, D. Liu, T. B. Hoffman, M. Nguyen, S. Kim, J. H. Edgar, X. Wu, L. Song, S. Ali, M. Ford, M. Toth, I. Aharonovich, Nanoscale 2018, 10, 7957.

[14] S. Choi, T. T. Tran, C. Elbadawi, C. Lobo, X. Wang, S. Juodkazis, G. Seniutinas, M. Toth, I. Aharonovich, ACS Appl. Mater. Interfaces 2016, 8, 29642.

[15] a)L. I. van der Wal, S. J. Turner, J. Zečević, Catal. Sci. Technol. 2021, 11, 3634; b)S. Hwang, X. Chen, G. Zhou, D. Su, Adv. Energy Mater. 2020, 10, 1902105; c)B. He, Y. Zhang, X. Liu, L. Chen, ChemCatChem 2020, 12, 1853.

[16] K. Kamatani, K. Higuchi, Y. Yamamoto, S. Arai, N. Tanaka, M. Ogura, Sci. Rep. 2015, 5, 10161.

[17] a)M. Ziatdinov, O. Dyck, X. Li, B. G. Sumpter, S. Jesse, R. K. Vasudevan, S. V. Kalinin, Sci. Adv. 2019, 5, eaaw8989; b)H. Amara, S. Latil, V. Meunier, P. Lambin, J. C. Charlier, Phys. Rev. B 2007, 76, 115423; c)D. Wong, J. Velasco, L. Ju, J. Lee, S. Kahn, H.-Z. Tsai, C. Germany, T. Taniguchi, K. Watanabe, A. Zettl, F. Wang, M. F. Crommie, Nat. Nanotechnol. 2015, 10, 949.

[18] A. Lyalin, A. Nakayama, K. Uosaki, T. Taketsugu, J. Phys. Chem. C 2013, 117, 21359.

[19] A. Centrone, Annu. Rev. Anal. Chem. 2015, 8, 101.

[20] a)Y. Levratovsky, E. Gross, Faraday Discuss. 2016, 188, 345; b)J. Karst, F. Sterl, H. Linnenbank, T. Weiss, M. Hentschel, H. Giessen, Sci. Adv. 2020, 6, eaaz0566.

[21] K. L. Chagoya, D. J. Nash, T. Jiang, D. Le, S. Alayoglu, K. B. Idrees, X. Zhang, O. K. Farha, J. K. Harper, T. S. Rahman, R. G. Blair, ACS Sustain. Chem. Eng. 2021, 9, 2447.

[22] A. Dazzi, R. Prazeres, F. Glotin, J. M. Ortega, Ultramicroscopy 2007, 107, 1194.

[23] a)S. L. Moore, C. J. Ciccarino, D. Halbertal, L. J. McGilly, N. R. Finney, K. Yao, Y. Shao, G. Ni, A. Sternbach, E. J. Telford, B. S. Kim, S. E. Rossi, K. Watanabe, T. Taniguchi, A. N. Pasupathy, C. R. Dean, J. Hone, P. J. Schuck, P. Narang, D. N. Basov, Nat. Comm. 2021, 12, 5741; b)J.-H. Jiang, X. G. Xu, L. Gilburd, G. C. Walker, Opt. Express 2017, 25, 25059; c)S. Dai, Z. Fei, Q. Ma, A. S. Rodin, M. Wagner, A. S. McLeod, M. K. Liu, W. Gannett, W. Regan, K. Watanabe, T. Taniguchi, M. Thiemens, G. Dominguez, A. H. C. Neto, A. Zettl, F. Keilmann, P. Jarillo-Herrero, M. M. Fogler, D. N. Basov, Science 2014, 343, 1125.

[24] a)R. Geick, C. H. Perry, G. Rupprecht, Phys. Rev. 1966, 146, 543; b)J. D. Caldwell, A. V. Kretinin, Y. Chen, V. Giannini, M. M. Fogler, Y. Francescato, C. T. Ellis, J. G. Tischler, C. R. Woods, A. J. Giles, M. Hong, K. Watanabe, T. Taniguchi, S. A. Maier, K. S. Novoselov, Nat. Comm. 2014, 5, 5221.

[25] T.-X. Huang, X. Cong, S.-S. Wu, K.-Q. Lin, X. Yao, Y.-H. He, J.-B. Wu, Y.-F. Bao, S.-C. Huang, X. Wang, P.-H. Tan, B. Ren, Nat. Comm. 2019, 10, 5544.

[26] B. Lyu, H. Li, L. Jiang, W. Shan, C. Hu, A. Deng, Z. Ying, L. Wang, Y. Zhang, H. A. Bechtel, M. C. Martin, T. Taniguchi, K. Watanabe, W. Luo, F. Wang, Z. Shi, Nano Lett. 2019, 19, 1982.

[27] a)L. N. He, D. M. Wang, S. Hasegawa, J. Non Cryst. Solids 2000, 261, 67; b)G. Socrates, Infrared and Raman characteristic group frequencies: tables and charts, John Wiley & Sons, 2004.

[28] a)E. San Andrés, A. del Prado, F. L. Martínez, I. Mártil, D. Bravo, F. J. López, J. Appl. Phys. 2000, 87, 1187; b)T. Oh, J. Korean Phys. Soc. 2010, 56; c)D. B. Mawhinney, J. A. Glass, J. T. Yates, J. Phys. Chem. B 1997, 101, 1202.

[29] P. G. Pai, S. S. Chao, G. Takagi, G. Lucovsky, J. Vac. Sci. Tech. A 1986, 4, 689.

[30] N. Patel, S. Mariazzi, L. Toniutti, R. Checchetto, A. Miotello, S. Diré, R. S. Brusa, J. Phys. D: Appl. Phys. 2007, 40, 5266.

[31] R. W. Dorn, M. J. Ryan, T.-H. Kim, T. W. Goh, A. Venkatesh, P. M. Heintz, L. Zhou, W. Huang, A. J. Rossini, Chem. Mat. 2020, 32, 3109.

[32] a)G. H. Ryu, H. J. Park, J. Ryou, J. Park, J. Lee, G. Kim, H. S. Shin, C. W. Bielawski, R. S. Ruoff, S. Hong, Z. Lee, Nanoscale 2015, 7, 10600; b)O. Mouhoub, R. Martinez-Gordillo, J. Nelayah, G. Wang, J.-H. Park, K. Kim, Kang, Y. Lee, Hee, C. Bichara, A. Loiseau, C. Ricolleau, H. Amara, D. Alloyeau, Phys. Rev. Mater. 2020; c)S. Liu, J. Comer, A. C. T. van Duin, D. M. van Duin, B. Liu, J. H. Edgar, Nanoscale 2019, 11, 5607.

[33] F. L. Galeener, G. Lucovsky, J. C. Mikkelsen, Phys. Rev. B 1980, 22, 3983.

[34] L. Jun, X. Shuping, G. Shiyang, Spectrochim. Acta A Mol. Biomol. Spectrosc. 1995, 51, 519.

[35] D. Richards, A. Zayats, P. Royer, D. Barchiesi, G. Lerondel, R. Bachelot, Philos. Trans. Royal Soc. A 2004, 362, 821.

[36] D. J. Nash, K. L. Chagoya, A. Felix, F. E. Torres-Davila, T. Jiang, D. Le, L. Tetard, T. S. Rahman, R. G. Blair, Adv. Appl. Ceram. 2019, 118, 153.

[37] Zhong, L.; Amber, M.; Natalie, B.; Shruti, S.; Kehao, Z.; Yifan, S.; Xufan, L.; Nicholas, J. B.; Hongtao, Y.; Susan, K. F.-S.; Alexey, C.; Hui, Z.; Stephen, M.; Aaron, M. L.; Kai, X.; Brian, J. L.; Marija, D.; James, C. M. H.; Jiwoong, P.; Manish, C.; Raymond, E. S.; Ali, J.; Mark, C. H.; Joshua, R.; Mauricio, T., 2D materials advances: from large scale synthesis and controlled heterostructures to improved characterization techniques, defects and applications. 2D Materials 2016, 3 (4), 042001.

[38] Lin, Z.; Carvalho, B. R.; Kahn, E.; Lv, R.; Rao, R.; Terrones, H.; Pimenta, M. A.; Terrones, M., Defect engineering of two-dimensional transition metal dichalcogenides. 2D Materials 2016, 3 (2), 022002.

[39] Zhang, J.; Sun, R.; Ruan, D.; Zhang, M.; Li, Y.; Zhang, K.; Cheng, F.; Wang, Z.; Wang, Z.-M., Point defects in two-dimensional hexagonal boron nitride: A perspective. Journal of Applied Physics 2020, 128 (10), 100902.

[40] Wang, Y.; Mao, J.; Meng, X.; Yu, L.; Deng, D.; Bao, X., Catalysis with Two-Dimensional Materials Confining Single Atoms: Concept, Design, and Applications. Chemical Reviews 2019, 119 (3), 1806-1854.

[41] Tang, T.; Wang, Z.; Guan, J., A review of defect engineering in two-dimensional materials for electrocatalytic hydrogen evolution reaction. Chinese Journal of Catalysis 2022, 43 (3), 636-678.

[42] Chagoya, K. L.; Nash, D. J.; Jiang, T.; Le, D.; Alayoglu, S.; Idrees, K. B.; Zhang, X.; Farha, O. K.; Harper, J. K.; Rahman, T. S.; Blair, R. G., Mechanically Enhanced Catalytic Reduction of Carbon Dioxide over Defect Hexagonal Boron Nitride. ACS Sustainable Chemistry & Engineering 2021, 9 (6), 2447-2455.

[43] Tran, T. T.; Bray, K.; Ford, M. J.; Toth, M.; Aharonovich, I., Quantum emission from hexagonal boron nitride monolayers. Nat Nanotechnol 2016, 11 (1), 37-41.

[44] Liang, Q.; Zhang, Q.; Zhao, X.; Liu, M.; Wee, A. T. S., Defect Engineering of Two-Dimensional Transition-Metal Dichalcogenides: Applications, Challenges, and Opportunities. ACS Nano 2021, 15 (2), 2165-2181.

[45] Zhu, J.; Wang, Z.; Yu, H.; Li, N.; Zhang, J.; Meng, J.; Liao, M.; Zhao, J.; Lu, X.; Du, L.; Yang, R.; Shi, D.; Jiang, Y.; Zhang, G., Argon Plasma Induced Phase Transition in Monolayer $MoS_2$. Journal of the American Chemical Society 2017, 139 (30), 10216-10219.

[46] Solomon, J. M.; Ahmad, S. I.; Dave, A.; Lu, L.-S.; Wu, Y.-C.; Chang, W.-H.; Luo, C.-W.; Her, T.-H., Ultrafast multi-shot ablation and defect generation in monolayer transition metal dichalcogenides. AIP Advances 2022, 12 (1), 015217.

[47] Xu, T.; Zhou, Y.; Tan, X.; Yin, K.; He, L.; Banhart, F.; Sun, L., Creating the Smallest BN Nanotube from Bilayer h-BN. Advanced Functional Materials 2017, 27 (19), 1603897.

[48] Iberi, V.; Liang, L.; Ievlev, A. V.; Stanford, M. G.; Lin, M.-W.; Li, X.; Mahjouri-Samani, M.; Jesse, S.; Sumpter, B. G.; Kalinin, S. V.; Joy, D. C.; Xiao, K.; Belianinov, A.; Ovchinnikova, O. S., Nanoforging Single Layer MoSe2 Through Defect Engineering with Focused Helium Ion Beams. Scientific Reports 2016, 6 (1), 30481.

[49] Palacios-Berraquero, C.; Kara, D. M.; Montblanch, A. R. P.; Barbone, M.; Latawiec, P.; Yoon, D.; Ott, A. K.; Loncar, M.; Ferrari, A. C.; Atatüre, M., Large-scale quantum-emitter arrays in atomically thin semiconductors. Nature Communications 2017, 8 (1), 15093.

[50] Blundo, E.; Cappelluti, E.; Felici, M.; Pettinari, G.; Polimeni, A., Strain-tuning of the electronic, optical, and vibrational properties of two-dimensional crystals. Applied Physics Reviews 2021, 8 (2), 021318.

[51] Schneider, C. A.; Rasband, W. S.; Eliceiri, K. W., NIH Image to ImageJ: 25 years of image analysis. Nature Methods 2012, 9 (7), 671-675.

[52] Richards, D.; Zayats, A.; Royer, P.; Barchiesi, D.; Lerondel, G.; Bachelot, R., Near-field optical patterning and structuring based on local-field enhancement at the extremity of a metal tip. Philosophical Transactions of the Royal Society of London. Series A: Mathematical, Physical and Engineering Sciences 2004, 362 (1817), 821-842.

[53] Lu, F.; Jin, M.; Belkin, M. A., Tip-enhanced infrared nanospectroscopy via molecular expansion force detection. Nature Photonics 2014, 8 (4), 307-312.

[54] Hohenberg, P.; Kohn, W., Inhomogeneous Electron Gas. Physical Review 1964, 136 (3B), B864-B871.

[55] Perdew, J. P.; Burke, K.; Ernzerhof, M., Generalized Gradient Approximation Made Simple. Physical Review Letters 1996, 77 (18), 3865-3868.

[56] Baroni, S.; de Gironcoli, S.; Dal Corso, A.; Giannozzi, P., Phonons and related crystal properties from density-functional perturbation theory. Reviews of Modern Physics 2001, 73 (2), 515-562.

[57] Giannozzi, P.; Baroni, S.; Bonini, N.; Calandra, M.; Car, R.; Cavazzoni, C.; Ceresoli, D.; Chiarotti, G. L.; Cococcioni, M.; Dabo, I.; Dal Corso, A.; de Gironcoli, S.; Fabris, S.; Fratesi, G.; Gebauer, R.; Gerstmann, U.; Gougoussis, C.; Kokalj, A.; Lazzeri, M.; Martin-Samos, L.; Marzari, N.; Mauri, F.; Mazzarello, R.; Paolini, S.; Pasquarello, A.; Paulatto, L.; Sbraccia, C.; Scandolo, S.; Sclauzero, G.; Seitsonen, A. P.; Smogunov, A.; Umari, P.; Wentzcovitch, R. M., QUANTUM ESPRESSO: a modular and open-source software project for quantum simulations of materials. Journal of Physics: Condensed Matter 2009, 21 (39), 395502.

[58] Lyu, B.; Li, H.; Jiang, L.; Shan, W.; Hu, C.; Deng, A.; Ying, Z.; Wang, L.; Zhang, Y.; Bechtel, H. A.; Martin, M. C.; Taniguchi, T.; Watanabe, K.; Luo, W.; Wang, F.; Shi, Z., Phonon Polariton-assisted Infrared Nanoimaging of Local Strain in Hexagonal Boron Nitride. Nano Letters 2019, 19 (3), 1982-1989.

[59] Ruta, F. L.; Sternbach, A. J.; Dieng, A. B.; McLeod, A. S.; Basov, D. N., Quantitative Nanoinfrared Spectroscopy of Anisotropic van der Waals Materials. Nano Letters 2020, 20 (11), 7933-7940.

EQUIVALENTS

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

Those skilled in the art will recognize, or be able to ascertain using no more than routine experimentation, many equivalents to the specific embodiments and methods described herein. Such equivalents are intended to be encompassed by the scope of the following claims.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A method for introducing a defect into a two-dimensional material comprising:
    a.) contacting a surface of the two-dimensional material with a nanoscale tip of a cantilever; and
    b.) exposing the surface of the two-dimensional material at the site of contact with the nanoscale tip, while maintaining contact between the nanoscale tip and the surface, to a laser pulse to introduce a defect in the two-dimensional material.

2. The method for introducing a defect into a two-dimensional material according to claim 1, wherein the contacting step and the exposing step are performed in an non-vacuum environment.

3. The method for introducing a defect into a two-dimensional material according to claim 2, wherein the contacting step and the exposing step are performed in a reactive/oxygen containing environment, in an ambient air environment, or in an inert environment.

4. The method for introducing a defect into a two-dimensional material according to claim 3, wherein the contacting step and the exposing step are performed in an inert environment.

5. The method for introducing a defect into a two-dimensional material according to claim 1, wherein the two-dimensional material is a carbon based material, a hexagonal boron nitride (h-BN) material, an aluminum diboride ($AlB_2$) material, a transition-metal-based dichalcogenide, or a heterostructure comprising two or more different two-dimensional materials.

6. The method for introducing a defect into a two-dimensional material according to claim 1, wherein the laser pulse has a power of about 0.1 mW to about 2.0 mW.

7. The method for introducing a defect into a two-dimensional material according to claim 6, wherein the laser pulse has a power of about 0.2 mW to about 1.8 mW.

8. The method for introducing a defect into a two-dimensional material according to claim 7, wherein the laser pulse has a power of about 0.5 mW to about 1.5 mW.

9. The method for introducing a defect into a two-dimensional material according to claim 8, wherein the laser pulse has a power of about 0.8 mW to about 1.3 mW.

10. The method for introducing a defect into a two-dimensional material according to claim 1, wherein the laser pulse has a wavelength of about 100 nm to about 160000 nm.

11. The method for introducing a defect into a two-dimensional material according to claim 10, wherein the laser pulse has a wavelength of about 1000 nm to about 10000 nm.

12. The method for introducing a defect into a two-dimensional material according to claim 11, wherein the laser pulse has a wavelength of about 5000 nm to about 10000 nm.

13. The method for introducing a defect into a two-dimensional material according to claim 12, wherein the laser pulse has a wavelength of about 7000 nm to about 8000 nm.

14. The method for introducing a defect into a two-dimensional material according to claim 1, wherein the exposure is performed for about 0.1 to 10.0 seconds.

15. The method for introducing a defect into a two-dimensional material according to claim 14, wherein the exposure is performed for about 1.0 to 5.0 seconds.

16. The method for introducing a defect into a two-dimensional material according to claim 1, wherein the nanoscale tip is a nanoscale infrared tip or an atomic force microscope tip.

17. The method for introducing a defect into a two-dimensional material according to claim 16, wherein the nanoscale tip is an atomic force microscope tip; and wherein the atomic force microscope tip is a silicon AFM tip, a silicon nitride AFM tip, a silicon oxide AFM tip, a high density carbon AFM tip, a quartz-like AFM tip, a gold coated AFM tip, a platinum coated AFM tip, a platinum/iridium coated AFM tip, a diamond-like-carbon (dlc) coated AFM tip, a diamond coated AFM tip, a conductive diamond coated AFM tip, a cobalt alloy coated AFM tip, a silicon nitride coated AFM tip, or a silicide coated AFM tip).

18. The method for introducing a defect into a two-dimensional material according to claim 16, wherein the nanoscale tip is an atomic force microscope tip; and wherein the atomic force microscope tip is a 4-sided pyramidal AFM tip, a non-rotated AFM tip, a rotated AFM tip, a 3-sided pyramidal AFM tip, an arrow shaped AFM tip, a square-based pyramid shaped AFM tip, a rectangular-based shaped AFM tip, a casted pyramidal AFM tip, a sharpened pyramidal AFM tip, a plateau AFM tip, a rounded AFM tip, or a spherical AFM tip.

19. The method for introducing a defect into a two-dimensional material according to claim 1, wherein the laser pulse is a pulse from a CO laser, a CO2 laser, a Nd:YAG laser, a frequency doubled Nd:YAG laser, an argon fluoride laser, a xenon chloride laser, a xenon fluoride laser, a helium cadmium laser, a rhodamine laser, a copper vapor laser, an argon laser, a helium neon laser, a krypton laser, a ruby laser, a Ti:sapphire laser, laser diodes, an alexandrite laser, a hydgrogen fluoride laser, an erbium:glass laser, or a pulse from solar illumination.

20. The method for introducing a defect into a two-dimensional material according to claim 1, wherein the defect is in the form of a triangular-shaped hole or a polygonal-shaped hole.

* * * * *